Sept. 7, 1926.

Re. 16,416

J. A. WHITTAKER

DEVICE FOR LEVELING WOODEN FLOOR SLEEPERS

Original Filed Nov. 7, 1923

Inventor

John A. Whittaker

By

S. E. Thomas

Attorney

Reissued Sept. 7, 1926. Re. 16,416

UNITED STATES PATENT OFFICE.

JOHN A. WHITTAKER, OF DETROIT, MICHIGAN.

DEVICE FOR LEVELING WOODEN FLOOR SLEEPERS.

Original No. 1,519,179, dated December 16, 1924, Serial No. 673,347, filed November 7, 1923. Application for reissue filed November 9, 1925. Serial No. 68,033.

My invention relates to a device for leveling wooden floor sleepers shown in the accompanying drawings and more particularly described in the following specification and claims.

In laying wooden flooring upon a concrete base it is essential that the floor sleepers to which the wood flooring is nailed should be properly leveled in order that the flooring nailed to the sleepers may be on a horizontal plane.

Heretofore it has been customary to insert shims or wedges beneath the sleepers in order that they may be properly leveled upon the concrete bed or slab before the concrete filling is poured between the sleepers to the level of the top of the latter. It has therefore required considerable time and labor to properly "lay-up" the sleepers upon an even plane before the concrete filling can be poured between the latter, and the time thus expended represents a large proportion of the cost of building a floor of this character.

The purpose of this invention therefore is to provide means whereby the sleepers may be quickly and easily leveled upon the concrete base or foundation which means is adapted to be readily adjusted to provide an even surface to which the floor may be nailed.

A further object of this invention is to provide a device which is adapted for a relatively wide range of adjustment by the mere reversal of the supporting shoe with reference to the sleeper and by reinserting the supporting screws in the shoe.

A further object of this invention is to provide a device which is comparatively inexpensive to manufacture and at the same time sufficiently strong for the purposes designed.

With the foregoing and other objects in view which will appear as the description proceeds the invention further resides in the combination and arrangement of parts and in the details of construction hereinafter described and claimed, it being understood that changes may be made in the precise embodiment of the invention herein described without departing from the spirit of the same.

In the drawings accompanying this specification:

Referring now to the letters of reference placed upon the drawings:

A denotes a rough floor level or slab of concrete.

B represents a wooden sleeper and C, a supporting shoe having a relatively deep channel portion $C^1$ to receive the wood sleeper B to which the flooring is nailed.

E, E, indicate screws projecting through laterally extended flanges $C^a$, by adjusting which the sleeper may be raised or lowered as required to insure a level surface to support the flooring.

Figure 1:
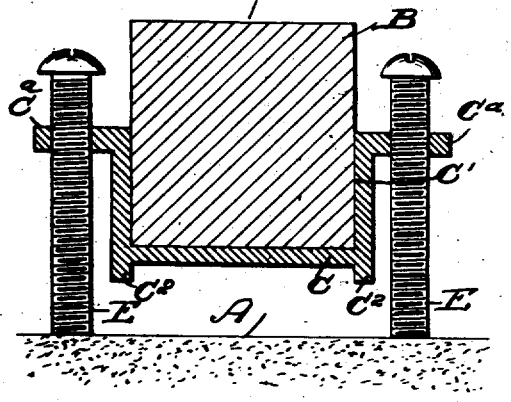
Figure 1 is a side elevation of the device as it would appear when supporting a sleeper, shown in cross-section, upon a rough floor level or base.
Figure 2:
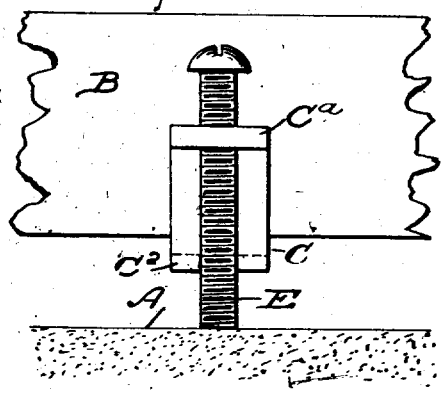
Figure 2 is an end elevation of the same and indicating a fragmentary portion of a sleeper supported in the device.
Figure 3:
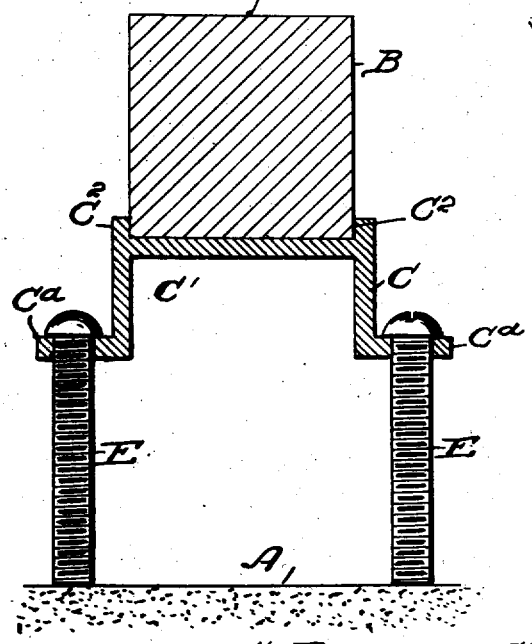
Figure 3 is a view similar to Figure 1 with the supporting screws reinserted in the opposite side of the shoe that the latter may be adapted for a relatively wider range of adjustment for supporting the sleeper mounted therein.
Figure 4:
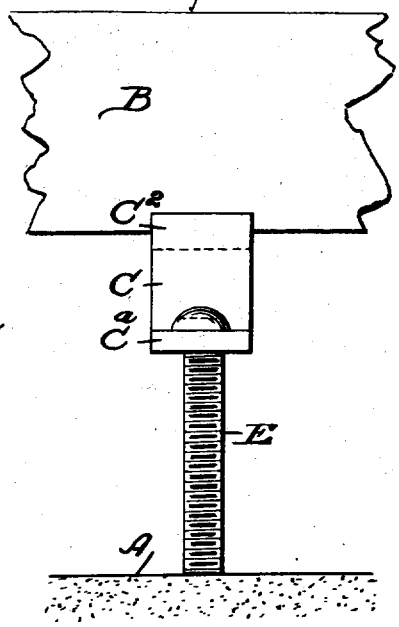
Figure 4 is an end elevation of the device shown in Figure 3 with a fragment of a sleeper resting thereon.

$C^2$, $C^2$ designate flanges projecting downwardly from the bottom of the shoe between which the sleeper may be mounted—as shown in Figures 3 and 4,—when it is desired to provide for a greater adjustment of the sleeper than would be possible when mounted upon the screws as shown in Figure 1.

Figure 5:
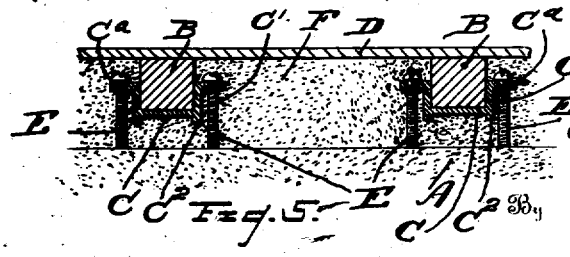
Figure 5 is a vertical fragmentary cross-sectional view through a floor sleeper, the concrete slab forming the rough floor level and also the concrete filling, poured between the sleepers.

F, denotes a concrete filling poured between the sleepers level with the top of the latter,—see Figure 5.

D represents a wood flooring nailed to the sleepers.

Having now indicated the several parts by reference letters the construction and operation of the device will be readily understood.

A rough floor level of concrete having been properly prepared, the sleepers B to which the wooden flooring D is afterwards attached,—are supported in a plurality of the yoke-shaped shoes C, spaced apart throughout the length of the sleepers,—the workman then proceeds to adjust the sleepers by means of the screws or bolts E so as to bring the top of the wooden sleepers to a uniform altitude throughout the surface of the floor. The sleepers having thus been properly leveled, the concrete filling F is poured between the sleepers until it reaches a level on a plane with the top of the latter. The sleeper supporting devices are thus embedded in the concrete together with the sleepers. The wooden floor is then nailed to the top of the sleepers in the usual manner.

Having thus described my invention what I claim is:

1. A device of the character described comprising an element located beneath and adapted to support a floor sleeper and forming a seat for the same, said element extending laterally from opposite sides of the said sleeper, and a plurality of adjusting screws projecting through holes tapped in the said element for regulating the altitude of the element with reference to a floor level, said screws projecting upwardly and downwardly from the said element, the upper portions of the screws being located at opposite sides of the sleeper and the lower portions of the screws forming supports for the element and the sleeper.

2. In a device of the character described, an adjustable single unit fitting located beneath and supporting a floor sleeper and having tapped holes extending through the fitting and a plurality of screws extending through the tapped holes of the fitting for adjusting the altitude of the floor sleeper to a floor level, said unit connecting the screws at opposite sides of the floor sleeper and forming a seat for the latter, and the said screws extending above and below the said fitting, the upper portions of the screws being located at opposite sides of the sleeper, and the lower portions of the screws forming supports for the sleeper and the fitting.

3. A device of the character described comprising a unitary element of channel-like form in cross-section adapted to receive and support a floor strip, said element having flanges integral therewith extending outwardly from its side walls to provide a relatively broad support for the floor strip, and a plurality of adjustable screws projecting through holes tapped to said flanges for regulating the altitude of the device with reference to a floor level.

4. In a device of the character described, a U-shaped shoe for supporting a floor sleeper having laterally projecting flanges tapped to receive supporting screws or bolts, adjustable screws or bolts mounted in said flanges, said shoe also provided with ribs extending downwardly from the base of the shoe and spaced apart to receive a sleeper when reversed upon the supporting screws or bolts.

In testimony whereof, I sign this specification.

JOHN A. WHITTAKER.